May 19, 1964    F. G. GLASBY    3,133,483
METHOD AND APPARATUS FOR MAKING SPIRALLY WOUND CONTAINERS
Filed Dec. 13, 1961    4 Sheets-Sheet 1

Inventor
Francis G. Glasby
By his attorneys
Howson and Howson

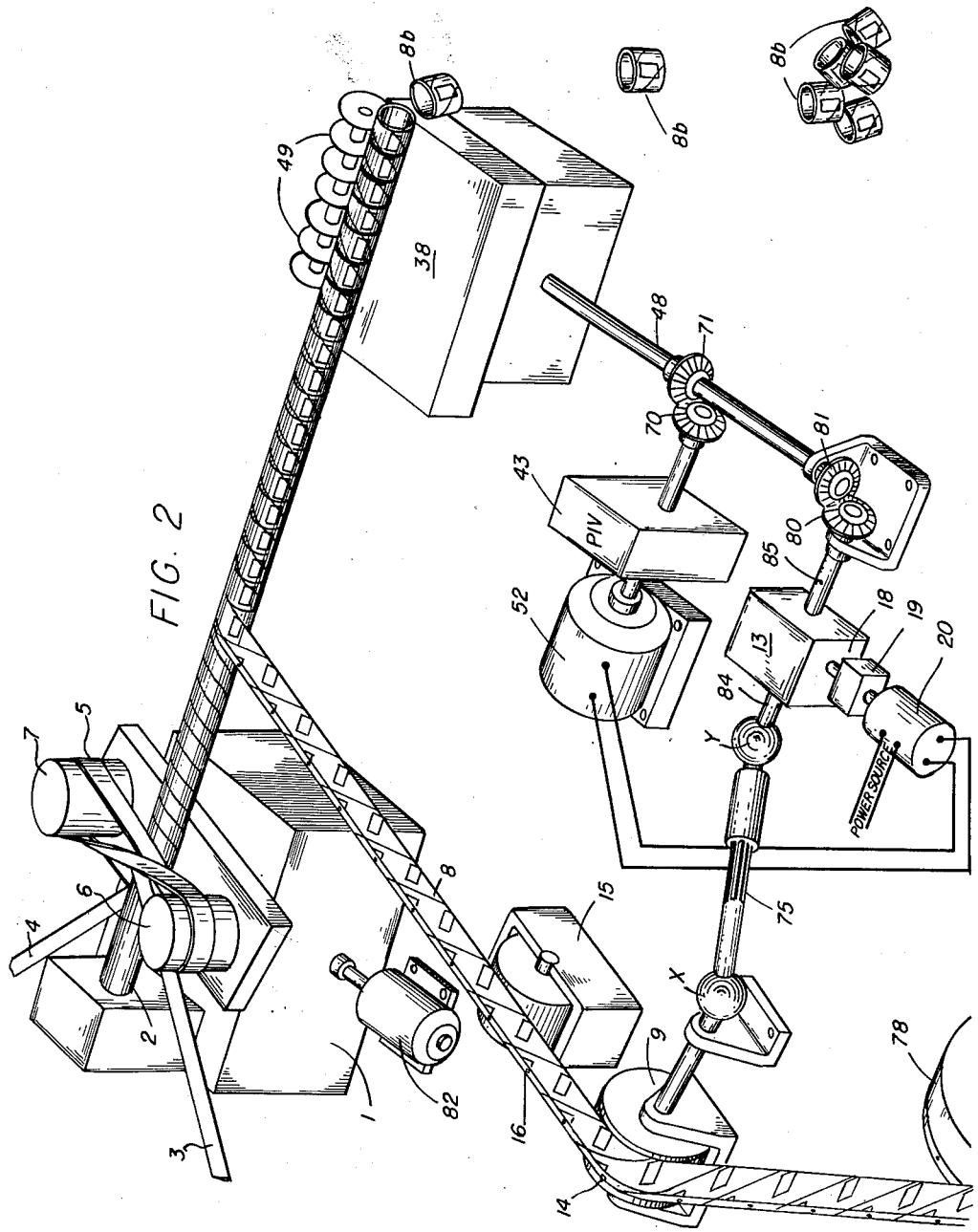

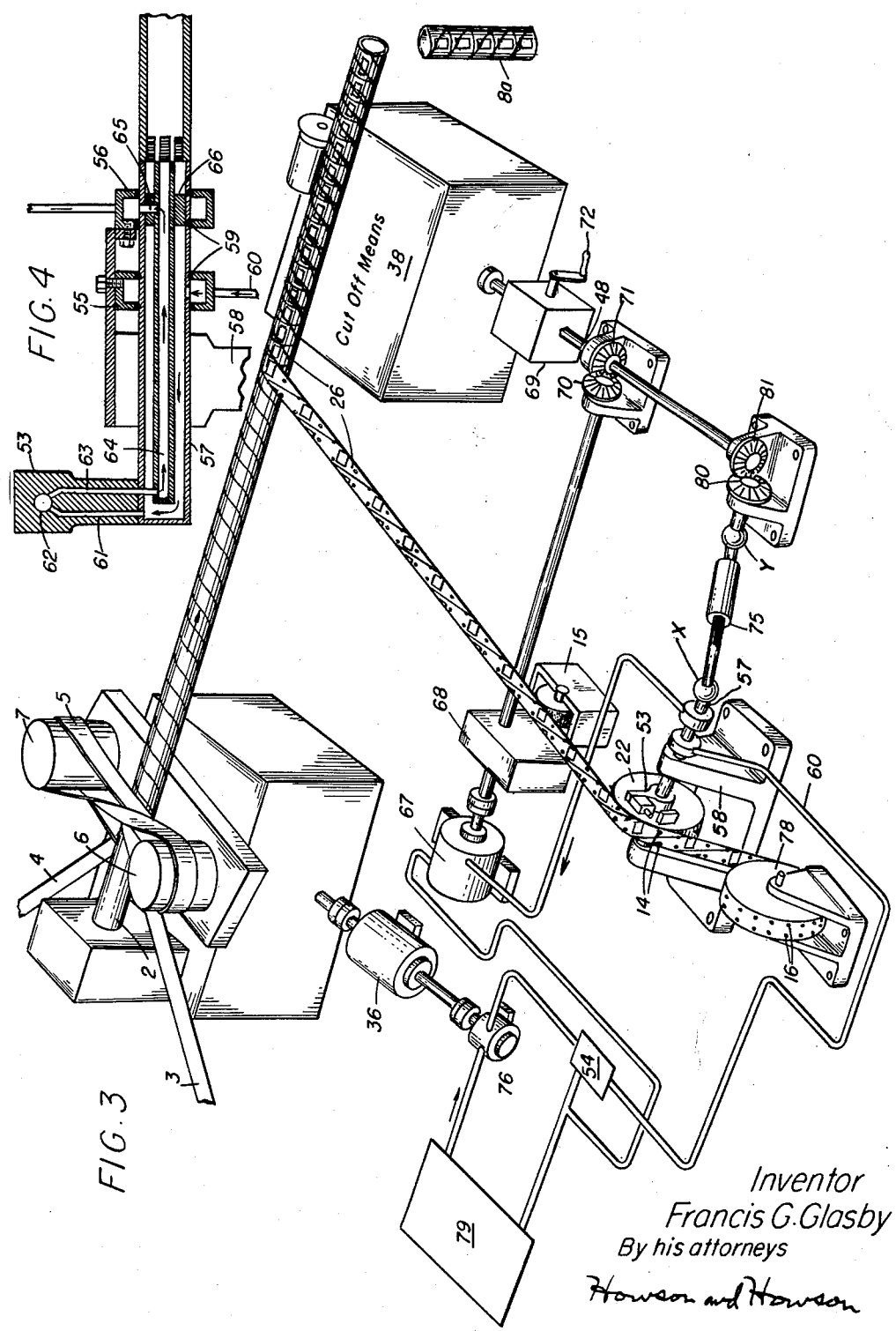

May 19, 1964    F. G. GLASBY    3,133,483
METHOD AND APPARATUS FOR MAKING SPIRALLY WOUND CONTAINERS
Filed Dec. 13, 1961    4 Sheets-Sheet 4
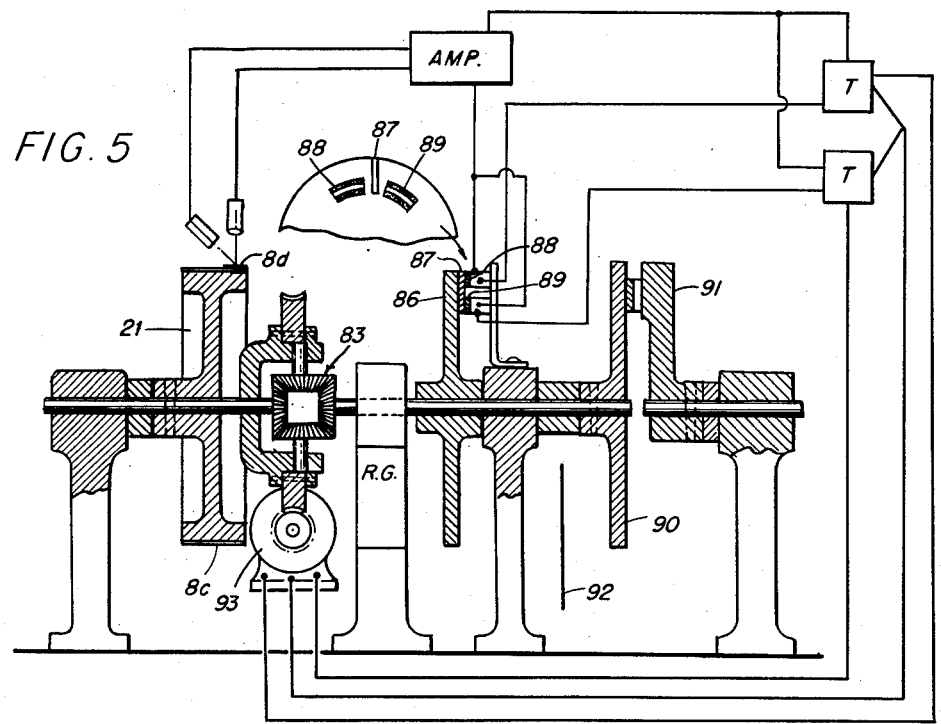
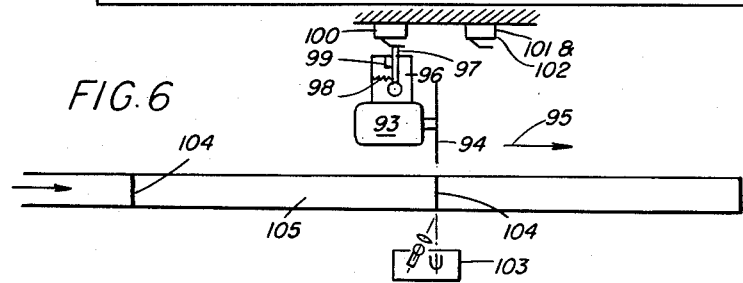
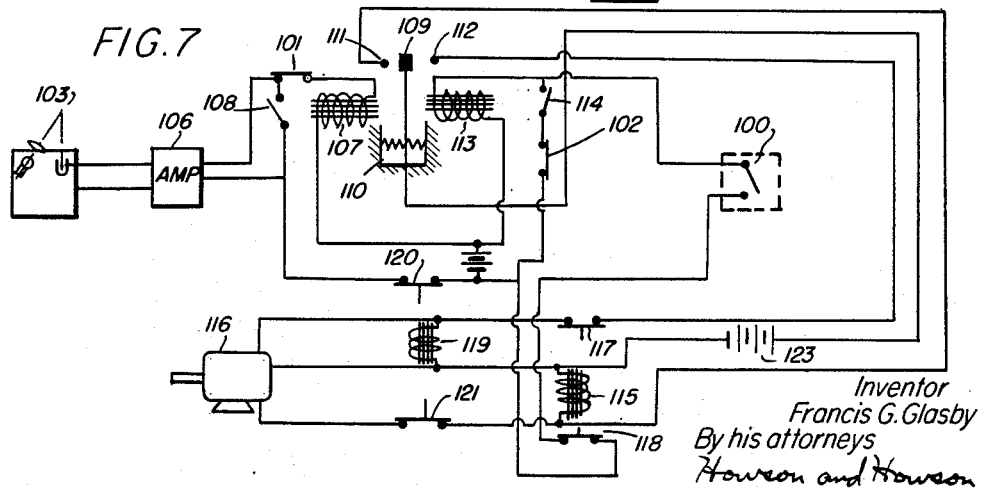
Inventor
Francis G. Glasby
By his attorneys
Howson and Howson United States Patent Office 3,133,483
Patented May 19, 1964

3,133,483
METHOD AND APPARATUS FOR MAKING
SPIRALLY WOUND CONTAINERS
Francis G. Glasby, Chesterfield, England, assignor to Robinson & Sons Ltd., Chesterfield, England, a British company
Filed Dec. 13, 1961, Ser. No. 159,017
14 Claims. (Cl. 93—80)

This invention relates to method and apparatus for making spirally wound containers. In making round containers with the unitary pattern strip spirally wound on the outside it is necessary to keep the pattern in registry with the ends of the container. This requires synchronism between the pattern and the length of the container when cutting off the containers from the tube which is being continuously wound.

The U.S. Patent to Ernest B. Robinson No. 2,734,432 discloses a machine construction where the cutting operation on a pattern bearing spiral tubing is triggered to obtain a desired cutting relationship with the pattern but in which such triggering operation co-incidentally allows the cutting means to refer to the tube and adopt a traversing speed identical with that of the tube being cut. It does this either by pushing the cutting means along by the tubing or by power assisted or servo means which pick up and keep the traverse motion of the patterned tube. It follows that during the operative part of the cutting cycle i.e., from the triggering to termination of cutting, the cutter is able to relate its position and traverse characteristics to the requirements of the moving tubing so as to produce clean cutting at the desired cutting location relative to the pattern.

It is well recognized that there may be limitations in the operating speeds and efficiencies of such trigger operated cutting machines due to the possibility of variation of the triggering characteristics of the apparatus using during successive cutting cycles, and also due to the fact that there is a waiting period after each cutting cycle before the next triggering operation.

It is widely held that there are advantages in using cutting machines of the type wherein regular reciprocation of the cutter to and fro in continuous manner is obtained. Such machines are usually, though not necessarily, operated by a continuously rotating traverse cam with a cam track so designed as to cause the cutter to assume substantially constant speed during the period when actual cutting takes place. In the adaptation of such machines for cutting in register, means which usually include a selector switch associated with the cutter and detector means, usually of photoelectric type referring to control features on the patterned strip or patterned tubing, interrelate the information from the two reference points to determine the need for corrective action as regards cutting register. Such corrective action usually takes the form of an advancement or retarding of the cutting cycle relative to the presented patterned tube, either by using a differential gear which will enable the required motion to be injected or extracted, or by adjustment temporarily or permanently of the ratio of the variable speed means normally provided between the winding and cutting means of such continuous type machines. One of the problems associated with such continuous machines is that "out of phase" conditions frequently develop due to a sudden fluctuation of the rate of tube presentation beyond the capacity of the correction means to deal with in one correcting operation. Frequently a number of corrections are required before the cutting register conditions are restored satisfactorily with considerable waste of tube material, particularly where the tubing is being cut into individual containers, as in a gang cutoff during the cutting operation. Starting up is often wasteful as it may take some time for initial cutting register to be achieved, usually requiring manual adjustment before the control means can take over. This procedure with the consequent waste of material occurs each time the machine is started up. Should the winding machine be slowed down at any time, as is often required to match subsequent processes, the cutting position will deviate from that required due to the constant time lag of the detector and correction circuit applied to a verying speed of output. Some further correction is needed to compensate for this effect.

Inevitably the control gear for such continuous machines becomes complicated and requires an operative of more than average intelligence to obtain satisfactory running.

In the present invention I provide a method for winding and cutting patterned tubes wherein the cutoff is of the continuously reciprocating type, the continuous reciprocation being performed under control of and by continuous reference to the pattern bearing strip material. The cutoff may be of well known type where the reciprocation of the cuttin means is caused by a continuously rotating cam with a cam track so designed as to cause the cutter to assume substantially constant speed during the period when active cutting takes place. Alternatively any continuously cycling positively driven reciprocating motion would suffice wherein the drive is taken from an external source, e.g. a shaft.

It follows that practicing the use of this invention the method involves the control of continuously recurring connected cyclic cutting operations upon pattern bearing tubing under continuous control of the material being operated upon whereby a constant substantially invariable timing and space relationship is established between the cutting means and predetermined pattern indicia upon the continuously formed tubing.

It is an advantageous result of this method that the relationship established between cutting and the patterns is not disturbed by variations in rate of presentation of patterned tubing as the cutting is under the continuous control of control indicia which bear a definite space relationship to the patterns on the tube.

It should be understood that variations in rate of the tube forming may occur at any time during the cutting cycles, and this invention affords method and means whereby such variations are compensated for immediately when they arise, instead of at regular periodic reference times as is customary in the known art.

FIG. 2 is a view similar to FIG. 1 in which the modulation of the cutting means is applied to the motor for the cutting means.

FIG. 3 is a view of a single cut spiral winder of the continuous type containing another embodiment of my invention in which hydraulic means are used to modulate the cutting means as required to synchronize the cutting means and the pattern strip.

FIG. 4 is a detail view in vertical through the rotary glands of the hydraulic means of FIG. 3.

FIG. 5 is a detail view of a modified form of metering down the pattern strip using pattern marks on the latter instead of perforations.

FIG. 6 is a detail view of auxiliary means for applying fine corrections of non-cumulative register arising after the point of reference in the construction of FIGS. 1, 2 and 3.

FIG. 7 is a circuit diagram relating to FIG. 6.

Figure 1:
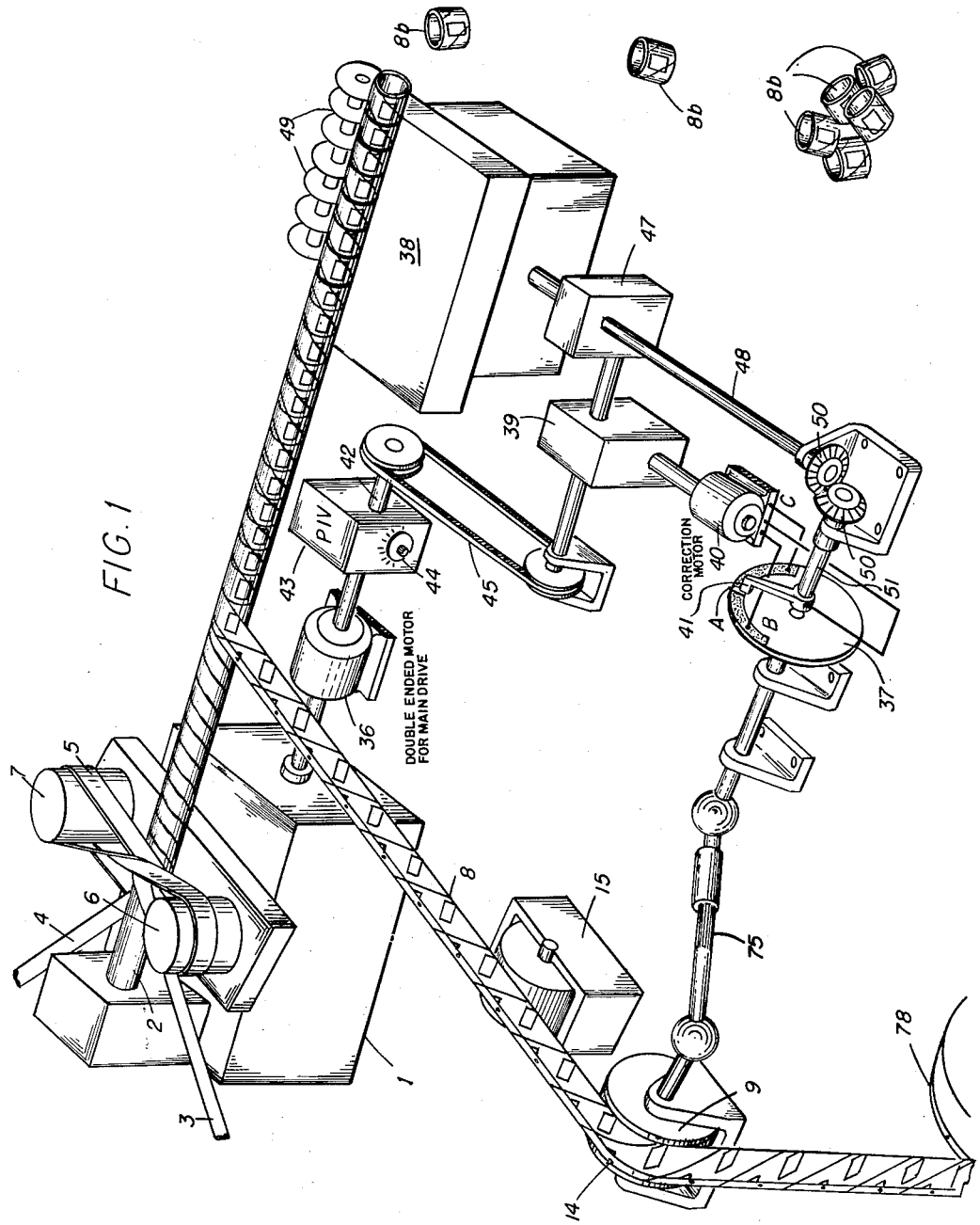
FIG. 1 is a perspective view of a multiple or gang cutting spiral winder, containing the invention, and electrically driven.

Referring first to the construction of FIG. 1, there is shown a conventional winder generally designated by the reference character 1 having a mandrel 2 upon which cardboard strips 3 and 4 to form the base tube are drawn in by the usual reverse winding belt 5. This winding belt 5 is driven by belt pulleys 6 and 7 which receive motion from a double ended motor 36 and suitable connecting gear (not shown). In some position subsequent or after the tube forming, when considered in the direction of the movement of the tube, a unitary pattern strip 8 is drawn onto the exterior of the already formed base tube and made to adhere to the exterior of the base tube by glue applied by the usual glue feeding means 15. A "unitary" pattern is one having a beginning and an end as distinguished from a "barber pole" pattern. The pattern strip is fed onto the base tube at the same spiral angle or pitch as the base tube convolutions, but normally in an offset position which permits the pattern strip to cover the seam on the outside of the base tube. The application of the pattern strip 8 to the base tube produces a succession of patterns upon the outside of the base tube. It will be understood that the pattern strip can be one of the layers of the base tube, or if desired, the pattern strip can be used as the only layer with no base tube layers thereunder.

Heretofore, most methods and machines for keeping spirally wound patterns in register with the ends of the containers have achieved registry by observation of special marks on the pattern strip without any physical linking up or exact physical contact from the registry point of view between the material of the pattern strip and the cutting means. The invention can be used on single cut winders with the continuously being-formed tube being first cut into sticks or lengths containing a plurality of containers and the cutting up into the actual containers being done on another machine. It can also be used on spiral winders known as gang cutters in which the cutting into containers is done directly on the winding mandrel with a plurality of containers cut off simultaneously. According to the present invention means are proposed which link or connect the pattern strip physically with the cutter to meter the cut or to synchronize the timing of the pattern strip and the cutting operation.

In the example shown in FIG. 1 metering is achieved by having perforations 16 along one or both of the edges of the pattern strip and passing that strip over a freely rotatable drum 9 on whose periphery are pegs or pins 14 adapted to engage the holes in the strip. For simplicity in this figure of the drawings I have shown perforations and pegs along one edge only. The rotation of the freely rotatable drum gives a physical contact measure by which the cutting can be synchronized with the pattern strip. If the circumference of the drum is equal to the length of the pattern in the strip, the drum will make one rotation for every pattern. If a larger drum is used and the circumference of the drum is equal to the length of the strip contained in each bite or stick, the drum will make one rotation for every stick.

If the pattern strip were of stronger material than is generally customary in the industry at the present time, it would be possible for the pattern strip to drive a continuous type of cutoff in which the tube driving means rotated once for each revolution of the freely rotating measuring drum. However, since the pattern strip in use at the present time for the production of paper or paper and foil tubes is generally not strong enough to drive the cutoff by itself, I have incorporated servo-means to achieve the desired result. Various forms of mechanisms may be employed, some of them electrical and others hydraulic. This construction of FIGS. 1–5 can also be used where the strip is not strong enough to provide a direct drive for the cutting operation. It is visualized that if the perforated pattern strip of FIGS. 1–5 are strong enough the cutoff means would receive its motive power from the pattern strip alone.

Turning now to the construction of FIG. 1 the main drive of the cutoff is provided by the same motor responsible for driving the winder, and modulations of the relationship therebetween can be supplied by a speed differential interposed between the winder and the cutoff.

FIGURE 1 is an example wherein the cutter is preset by adjustment of a PIV (positively infinitely variable member) or the like so that it reciprocates at the same linear speed as the progress of the tube being wound. The perforated strip 8 drives a drum 9 which is attached to a reference disc 37 containing an internal zone A, a late zone C and an early zone B. The cutoff 38 receives its main power mechanically from the winder, using the same drive motor. A differential 39 is interposed in the drive to the cutoff so that additions or subtractions of motion can be applied by means of a correction motor 40 capable of rotating in either direction as required. A reference arm 41 is also connected to the main drive shaft 42 through suitable gearing, hereinafter described and will serve to indicate the state of the cutting cycle at any time. This reference arm 41 is adjacent to the zoned reference disc 37 and searches for the internal zone A thereon. The reference arm has a brush contact which, when cutting is taken place at a desired location will be in the internal zone of the disc. Should cutting depart from the desired relationship, this will cause a differential movement between the reference arm and the zoned disc and the brush contact will then engage with either the early or late zone B or C of the disc, completing an electrical circuit causing the correction motor 40 to rotate in one direction or the other. Rotation of the correction motor 40 will inject plus or minus motion into the cutting cycle so as to correct the cutting condition. This also causes the reference arm 41 and the zoned disc 37 to rotate independently but oppositely relative to each other till the early or late zones B and C lose contact with reference arm 41 which will then be between zones B and C. Any departures from such relationship only occur when cutting deviates from synchronism with the consumption of the patterned strip.

The connection between the main drive shaft 42 and the reference arm 41 is as follows. The main shaft passes through a positive infinitely variable member 43 whose function is to set the ratio of cutting to winding. It has a knob or handle 44 to permit adjustment of the cutter when starting up the machine. By means of a belt 45 the PIV 43 is connected to a differential 39 to which the correction motor 40 is connected. The other side of the differential is connected by a right angle worm reducer 47 to a shaft 48 providing a positive drive between a reciprocating cam (not shown) for the cutter carriage 38, and the gang cutters 49 at one end and at the other end by bevel gears 50 (1 to 1 ratio) leading to a shaft 51 on which the reference arm 41 is tightly fastened.

To cooperate with the connection from the main drive shaft to the reference arm 41 the disc 37 bearing the zones B and C is driven by the metering drum 9. The drum shaft working through a spline 17 drives the disc 37 positively.

Any fluctuation of consumption of patterned strip, which will of course result in corresponding fluctuation in output of patterned tube will cause some differential movement of the zoned reference disc 37 relative to the reference arm 41, so that the reference arm 41 no longer lies between the "early" and "late" zones, but now establishes contact with one of the zones and will cause rotation of the correction motor 40 in the required direction until the proper relationship of the reference arm to the early and late zones is restored. Thus the cutting relationship with the patterns is regulated to the desired relationship. The gang cutters cut the tube end into individual containers 8b.

When the main motor 36 starts winding the tube and pulling in the perforated pattern strip 8, the disc 37 will revolve in time with the length of strip consumed. Through the PIV 43, shaft 48 and shaft 51 the reference arm 41 rotates with the plate 37. If the pattern strip tries to get out of register with the winding and the cutting means, the arm contacts zone B or C on the plate 37, correction motor 40 applies a correction to differential 39 and the time of cut relative to the winding is adjusted. Thus there is a positive contact correction.

Referring to FIGURE 2, we have a cutter 38 of similar construction to that of FIGURE 1, but driven by a variable speed motor 52, independent of the motor drive 82 for the winder. The motor 52 drives the cutter 38 through a positively infinitely variable drive 43, bevel gears 70, 71 and shaft 48. In order to synchronize the cutter speed and the speed at which the pattern strip 8 is consumed, a bevel gear 81 is provided attached to the shaft 48 which cooperates with yet another bevel gear 80.

The gear 80 is fixed to a shaft 85 which constitutes one input to a differential gear box 13. The second input to the differential 13 is constituted by a shaft 84 and the third connection is a shaft 18. Reference shaft 84 receives its rotary motion from freely rotatable drum 9, to which it is connected by constant velocity angular joints X and Y and splined connection 75. The reference shaft 84 will rotate at the same speed as drum 9 and will afford indication of the rate of rotation and angular position of the drum 9. Drum 9 is driven by engagement of perforations 16 along one or both edges of the pattern strip 8 with pegs or pins 14 on the periphery of drum 9. For simplicity perforations and pegs are shown along one edge only.

If the shafts 84 and 85 are turning at the same axial speeds, shaft 18 will remain fixed. If, however, there is a difference in speed, shaft 18 will be displaced angularly at a speed equal to the difference between the speeds of shafts 84 and 85. The shaft 18, through suitable gearing 19 drives the movable arm of a variable transformer 20 connected to a power source to increase or decrease the voltage applied to motor 52 and hence the speed of that motor.

It will be observed that the operation of FIG. 2 is in general principle that already described in relation to FIGURE 1 except that differential angular movement between reference shaft 84, which indicates the characteristics of the consumption of patterned strip, and the reference shaft 85 which indicates the state of the cutting cycle, will cause adjustment of the rotational speed of motor 52 until the two reference shafts have been restored to their correct angular relationship. Such master and slave electrical devices are well known and need no detailed amplification and the type shown is typical of an elementary system, though highly refined systems of many types are available. For this embodiment the reference shaft 84, being representative of the patterned strip, consumption is the "master" indicator. Reference shaft 85, being representative of the state of the cutting cycle, is the "slave" indicator, and interaction between these two reference shafts causes modulation of the speed of motor 52 which provides motive power for the cutting means so as to substantialy maintain a fixed angular relationship between the two reference shafts, and as a result between the cutter and the patterned tube in a linear sense.

In a further embodiment shown in FIG. 3 hydraulic means are provided for obtaining the requisite master and slave relationship for which electrical means were used in relation to FIGURE 2. It is a feature of this embodiment that it enables the practice of a method wherein continuously recurring connected cyclic cutting operations may be performed upon pattern bearing tubing under continuous control of the material being operated upon whereby a constant and substantially invariable timing and space relationship is established between the cutting means and predetermined pattern indicia upon the continuously being formed tubing. As in the previous embodiment relating to FIGURE 2 the present embodiment also has the advantageous result that relationship established between cutting and patterns is not disturbed by variations in rate of presentation of pattern tubing as the cutting is under continuous control of controlling indicia which bear definite space relationship to the patterns on the tube.

Referring to FIGURE 3 it will be seen that normal winding means are provided whereby base plies 3 and 4 are drawn on to a mandrel 2 by winding belt 5, said winding belt being driven by belt pulleys 6 and 7. A further ply of pattern-bearing strip material 26 bearing unitary patterns in succession along its surface designed to form the patterned exterior of the tube is drawn onto the base tube. In its movement towards the mandrel the pattern-bearing strip material which has perforations 16 set in regular relationship to the patterns is passed over pegged drum 22 in such a manner that the perforations 16 engage with the pegs 14 causing rotation of the drum at a rate in strict relationship with the rate at which patterns are being converted into tubular form. At the opposite end of the electric motor 36 which drives the winding means, attached to an extension of the motor shaft is a hydraulic pump 76 which draws fluid from a tank supply 79 and delivers the fluid to the inlet side of a plunger operated valve 53. Intermediate the pump 76 and the plunger operated valve 53 is a relief valve 54 capable of preventing the development of excess pressure in the system and also of returning fluid to the tank 79 which is in excess of that being passed by the plunger operated valve 53. Owing to the fact that the plunger operated valve is moving in rotary fashion suitable rotary gland arrangements have been provided at the valve 53 numbered 55, 56. Referring to FIG. 4 where an elemental form of fluid distribution means is shown, glands 55 and 56 are attached to the framework 58 in rigid manner so that multiple quill shaft 57 can rotate within the glands. Sealing means 59 are provided at the radially abutted surfaces to prevent leakage of fluid. It will be seen that the quill shaft 57 consists of two tubular elements one within the other with a space between them. Both shafts are blocked at their extremities and fluid admitted from the hydraulic pump 76 via pipe 60 passes between the two tubular elements and through passageway 61 into the plunger chamber 62 of plunger operated valve 53. The fluid flow permitted by the plunger operated valve flows along passageway 63 to the interior of the inner tubular member 64 and then to gland 56 via passageway 65. The passageway 65 extends from the interior of the inner tube through a sealing block 66 which fills up the cavity between the two tubular members in the region of gland 56. At the opposite end of the quill shaft 57 means are provided for blocking up the interior tube and the shaft from thereon becomes essentially of solid form.

The fluid passed by the plunger operated valve 53 enters a hydraulic motor 67 causing rotation of the same, and from thence flows back to the tank supply 79.

Rotation of the hydraulic motor 67 is supplied to the input shaft of a reduction gear box 68, the ratio of which is selected according to the over-all ratio of the mechanical components of the machine. The output shaft of this gear box passes into bevel gears 70 and 71 and from thence via a differential gear 69 to the reciprocating mechanism of the cutoff means 38. The third shaft of the differential gear 69 has a handle 72 attached thereto enabling an initial setting of the cutting cycle relative to the pattern bearing pattern strip 26 to be attained. The handle may conveniently have friction means to retain it in a position to which it has been rotated to prevent accidental slipping of the setting which has been established.

The mounting of the plunger operated valve 53 is such that it is able to swing in rotary fashion in the same plane as the rotation of the pegged drum. On the pegged drum is attached a projection which engages with an extension of the plunger of the hydraulic valve. In operation rotation of the drum will cause the associated projection to bear upon the plunger causing the valve to open, thus admitting pressurized fluid to the hydraulic motor. It follows that if the hydraulic motor is not rotating with sufficient speed there will be generated a higher contact pressure between the plunger extension and the drum projection causing wider opening of the valve to result, thus admitting more fluid until speed balance is achieved. Thus we have in effect a master and slave relationship between the drum and the hydraulic motor, which latter is the slave. Consequently the same relationship applies between the drum and the cutoff reciprocating mechanism due to the fixed ratio drive connection between the hydraulic motor and the cutoff mechanism.

FIG. 5 shows an embodiment which is a modification of FIG. 3. The apparatus shown is intended to replace part of the details of FIG. 3. Whereas in FIG. 3 perforations on the pattern strip and pegs on the drum insure physical matching of movement of the web and the drum, in FIG. 5 it is intended to show means whereby matching of a reference plate with the movement of the patterns on the strip can be used. The pattern strip maintains frictional peripheral contact with the drum and an electric eye scans for a control mark on the pattern strip.

There is a rotatable contact plate 86 connected to the drum 21 by means of a differential unit 83 with a reversing gear unit interposed to insure that the rotation of the drum 21 and contact plate 86 are in the same directional sense. The aim is for the contact plate 86 to maintain a gearlike relationship relative to repeated control marks on the strip. When such relationship is established, the pulse from the electrical eye activated by the control mark will be created at such time that the contact 87 of the plate 86 is between pairs of brush contacts 88 and 89. (See broken right angle view with 87 spaced out of contact with both 88 and 89.) Should this positional relationship not be established, the pulse from the electrical eye will occur when one of the pairs of the contacts 88 and 89 are in engagement with contact 87 causing one of the two circuits to be energized thus causing the electric motor 93 to apply rotation to the third shaft of the differential unit 83 which creates a differential rotation between contact plate 86 and drum 21 in a manner which will restore the directional relationship which it is desired to maintain. The contact plate 86 is pinned to the same shaft as the reference plate 90 which has an arm 91 which makes contact with the plunger type hydraulic valve 53 in the same manner as shown in FIG. 3. In effect the apparatus to the right of line 92 in FIG. 5 is the same as FIG. 3.

Although in the embodiment of FIG. 5 photocell detector means are used to scan for repeated control marks on the patterned strip, to determine the compensation necessary to be applied to maintain the contact plate 86 in a close angular relationship with the control marks on the strip passing round the drum 21, it should be understood that the use of this emboidment is not restricted to control marks of a visual type in conjunction with optical detection means but extends to the use of any type of control feature which can be selectively differentiated from its adjacent areas, by appropriate detection means, and could involve magnetic, frictional, electro conductive principles of any suitable altrenative. There must be physical contact in all forms to tie the pattern strip to the cutting accurately.

The embodiments of FIGS. 2, 3 and 5, the cutting operations, may be said to be *continuously* hooked up to the pattern bearing strip in that the development of each cutting cycle and the continuous development of such cycles is dependent upon the continued movement of the patterned strip past a reference point.

FIGS. 6 and 7 show in elementary form means for applying a fine adjustment to the cutting means. It will be appreciated that where the cutting position is determined by reference to pattern indicia at some distance from the actual point of cutitng there will, particularly where pattern strip is formed into a tube, be slight variations in the forming of such tube which would not be apparent at the strip stage i.e. before winding. Such variations might be due to slight extension or contraction of the spiral winding, variation of the base ply thickness, etc. and a further cause of deviation from the theoretical cutting position would be slight movement of the point of application of the patterned web to the base tube. Such deviations are not cumulative in nature and would not generally cause cutting misregister relative to the patterns of more than plus or minus one-eighth inch from the theoretical position. In the embodiment of FIGS. 6 and 7 means are shown whereby a final correction of cutting position can be achieved by direct reference to the patterns or control features relative thereto and the cutting means.

Referring to FIG. 6 we see that an electric motor 93 driving a saw 94 in the manner commonly associated with spiral cutoffs is able to reciprocate to perform a cutting stroke in the direction of arrow 95. Attached to the motor is a plate 96 holding a pivoted latch 97 which is biased by a spring 98 towards a stop 99. During its forward cutitng stroke the latch 97 is able to operate a switch 100 which is normally in the open condition. This switch forms part of the circuit of FIG. 7. Situated further along the path of the cutter are two further switches 101 and 102 which, for purpose of convenience, are shown as one as they are situated at similar distances along the path of the saw. These switches 101 and 102 are shown separately in FIG. 7 where their use will be more apparent and are of the normally closed variety and when contacted by the latch 97 assume an open condition for such time as the latch is in contact. FIG. 6 also shows a photocell observing unit 103 capable of observing the arrival of specified control features 104 situated along the tube 105. The idea underlying this apparatus is that when the saw is in the correct position for cutting it will be in line with the control feature and the control feature will also be under the light beam. To put this more clearly, if the cutter is about to cut on the wrong place relative to the control feature, the control feature will arrive at the cutter at a time earlier or later than the control feature arrives at the photocell. The switch 100 which is operated by the latch 97 forms part of a circuit capable of making corrections in one direction and the photocell forms part of a circuit capable of making corrections in the opposite direction. Referring to FIG. 6, it will be seen that if the control feature 104 arrives at the photocell 103 before the saw 94 is in line with the tube, then obviously the saw would tend to cut to the right of the control feature. Failure of the control feature to arrive at the photocell before it arrived at the saw would indicate that correction of the opposite sense was required. Referring to FIG. 7, it will be seen that photocell unit 103 is in circuit with an amplifier 106. The output connections of the amplifier 106 are in circuit with a solenoid 107 which is capable of operating two sets of contacts, namely, normally open contacts 108 which form part of a self-holding circuit controlling solenoid 107 and the normally centered contact 109. This contact 109 is normally biased by spring means 110 midway between contacts 111 and 112. The arrangement is such that there is a solenoid on each side of the central contact 109 each of which is capable of influencing the central contact to one side or the other, according to which solenoid is energized. Solenoid 113 is in the circuit of the switch 100 and, as mentioned, is capable of influencing central contact 109 towards contact 112 and at the same time is capable of closing the normally open switch 114 which forms part of a self-holding circuit for solenoid 113.

We now have a set of apparatus capable of energizing two separate circuits. In one circuit the energizing is initiated by the photocell unit 103 and in the other circuit is initiated by closing of the switch 100. Means are provided whereby which ever of the two circuits is energized first causes the other circuit to be placed in an isolated condition. In order that when the photocell unit takes charge the switch circuit dependent upon switch 100 is isolated, a solenoid 115 is situated in the circuit controlled by the photocell unit and its associated amplifier and when the electric motor 116 is energized by the photocell control circuit the solenoid 115 is also energized being parallel with the appropriate motor circuit and causes normally closed switches 117 and 118 to be opened for such time as the photocell control circuit is energized, thus isolating the circuit controlled by switch 100. Similarly, should the circuit controlled by switch 100 be in charge, solenoid 119, situated in the motor circuit controlled by the switch 100 is energized causing normally closed switches 120 and 121 to open, thus isolating the circuit controlled by the photocell unit. Sources of current supply 122 and and 123 are shown. During the time that either of the two circuits are energized the electric motor 116 will be caused to rotate in a direction depending upon which of the circuits is energized. It is intended that when the photocell unit operates and takes charge, the motor shall revolve in one direction, and when the switch circuit, dependent upon switch 100 is in charge, the motor will rotate in the opposite direction. In order that the rotation does not continue indefinitely, normally closed switches 101 and 102 are situated in the path of the advancing saw and its appendages, which include latch 97, in such a way that during the forward stroke the switches are caused to open momentarily and as will be seen by reference to FIG. 7 the openings of normally closed switches 101 and 102 will serve to destroy the self-holding properties of the respective solenoid circuits controlled by solenoids 107 and 113. Thus correction is applied to the motor 116 for only the period corresponding to the time it takes the latch 97 to travel between switch 100 and switch 101 or 102. It would be preferable for such correction to be applied to the motor 116 during that period before actual engagement of the saw with the tube takes place and by suitable situation of the switches this can be achieved. Alternatively, time delay means can be introduced into the circuitry which will delay the application of correction, the need for which has been determined, until after the cutting operation has been completed. Such correction can be applied in a variety of ways. For instance, referring to FIG. 3, the correction could be applied on the third shaft of differential 69. That is to say, on the same shaft as is controlled by handle 72. Further alternatives include the application of such correction to means for directly moving the saw relative to its mounting or the saw and motor relative to its mounting. In this latter case, this could be achieved by allowing the motor 116 to rotate a screw thread engaging in a nut which could be attached to the motor. Further alternatives would include means for varying the extent of a loop in the patterned strip on its way to the mandrel. Such a loop could be increased or decreased by the action of this electric motor in, for instance, the raising or lowering of an intermediate roller. It is not suggested that this exhausts the variety of adjustments which could be applied but these only serve as examples.

So far the embodiment of FIGS. 6 and 7 has shown the cut taking place at the control feature, but in practice this position of cutting may not be required, i.e. it may be necessary for cutting to take place at a position spaced apart from the control mark. Such requirements may be met by moving the photocell unit longitudinally to compensate for the displacement of the control mark from the desired cutting location.

Where in the claims I refer to "a constituent strip" I refer to any of the strips of material being spirally wound to form the tube. Thus, the term "a constituent strip" includes not only the pattern strip but any one of the base plies, the liner speed of such base ply being in very constant proportional relation to the speed of the pattern strip. In other claims, mention occurs of "the constituent pattern strip." This is intended to be limited to the pattern strip rather than to the patterns thereon. In other claims, I refer to "patterns on a constituent strip." This latter phrase is intended to show that the speed of the cut-off is related to the patterns. Wherein the claims we speak of the rate of development of each cutting cycle being a function of the linear speed of "the patterns on the constituent strip," reference is had to the fact that the rate of development and the linear speed are variables.

Some of the advantages of the invention over the prior art are:

(1) Starting up is automatically in register.
(2) No question of correcting register as cutter is hooked up to the material.
(3) Variation of speed of winding is automatically matched by cutting speed in a linear sense, i.e. cutoff.
(4) Changing cutting position due to change of speed and time lag does not arise.
(5) A surge in prior art machines tended to bedevil the controls and cause damaged work. In a machine built in accordance with the present invention a surge has no ill effect which would extend beyond the time when the surge takes place. Also, pattern and paper consumption automatically match each other.
(6) No controls for the operator to look after.
(7) No phasing cut-out.
(8) Certainty of detection.

Whenever the word integrated occurs in the claims it is intended to refer to the fact that pattern movements and the cutting cycle are tied together so that one is in direct proportion to the other.

What is claimed is:

1. Method of making tubular containers with a unitary pattern appearing on the outer surface comprising the steps of spirally winding one or more strips on a mandrel continuously to form tube, one of said strips bearing unitary patterns to produce required patterns on the tube, and passing the pattern strip in physical contact with a freely rotatable element before said tube is formed, in combination with the step of having the rotation of said rotatable element drive a cutter for cutting the patterned tube at intervals by continuous repeated cutting cycles via a servo mechanism to move the cutter according to the position of the rotatable element, thereby causing the cutter speed at any chosen location to bear a predetermined relationship to the surface speed of the rotatable element which relationship is repeated in successive cutting cycles for the same location.

2. Method of making a container with a unitary pattern appearing on the surface by spirally winding one or more strips of material onto a mandrel, comprising the steps of constantly spirally winding a tube with a spirally wound pattern strip appearing on the surface to produce the required pattern, keeping the axial speed of the being-formed tube and the linear speed of the pattern strip at a fixed ratio to each other, cutting the pattern tube at intervals by repeated cutting cycles, controlling cutter movement by continuous reference to the movement of the patterns on the patern strip, there being in each cutting cycle a period during which cutting actually takes place, the rate of development of each cutting cycle being proportional to the consumption of patterns on the constituent pattern strip; whereby cutting takes place in register with the pattern strip at all times considered at the point of reference.

3. Method of making containers with a unitary pattern strip spirally wound on the outside comprising the steps of continuously winding a base tube, winding a unitary pattern on the outside characterized by the steps of using a unitary drive means to wind the tube and to cut the tube at predetermined intervals, the time of cutting being continuously integrated to the linear arrival of the patterns on the tube; whereby the linear speed of the cutter at all times during the time when cutting is actually taking place maintains a constant ratio to the pattern strip consumption.

4. Method of making containers from one or more strips of material wherein a spirally wound pattern is produced in a continuous manner comprising the steps of winding one or more strips of material to form a tube, simultaneously cutting into repeated lengths by reciprocating cutting means, the ends of each length being in close register with the patterns appearing on the surface of the spirally wound tube lengths, using two controlling operations each dependent upon a separate reference to control indicia on the pattern material for the purpose of obtaining such close registry, the first reference being carried out at a point on the moving pattern strip or tube remote from the length of the tube to be cut off during the current cutting cycle, maintaining a preset relationship between the cutting means and the patterns considered at the first point of reference, the second reference being carried out within the span of the tube to be cut off to determine the presence of residual and intermediately occurring errors of registry, and applying further correction as may be determined by such second reference by adjusting the setting of the aforesaid preset phase relationship to compensate for incorrect phasing of the cutting means and pattern tube considered at the point of second reference, thereafter cutting lengths which will result in container lengths bearing a unitary pattern in close registry with the ends of the container lengths.

5. Method of producing containers from one or more strips of material, one of said strips bearing unitary patterns, wherein a spirally wound pattern tube is produced in a continuous manner, comprising the steps of winding one or more strips of material to form a tube, simultaneously cutting by reciprocating cutting means, the ends of each length being in close register with the patterns appearing on the surface of the spirally wound tube lengths, using two controlling operations each dependent upon a separate reference point to control indicia on the pattern material for the purpose of obtaining such close registry, the first reference point being carried out at a point on the moving pattern strip or tube remote from the length of the tube to be cut off during the current cutting cycle, maintaining a preset relationship between the cutting means and the patterns considered at the first point of reference, the second point of reference being carried out within the span of the tube to be cut off to determine the presence of residual and intermediately occurring errors of registry, applying further correction as may be determined by such second reference by periodically modulating the aforesaid preset phase relationship to compensate for incorrect phasing of the means and the pattern tube considered at the point of second reference, thereafter cutting lengths which will result in container lengths bearing a unitary pattern in close registry with the ends of the container lengths.

6. Method of making containers with the unitary pattern appearing on the outer surface by spirally winding one or more strips of material onto a mandrel continuously, comprising the steps of winding one or more strips of material to form a tube, one of the strips bearing a unitary pattern to produce required patterns on the outer surface of the tube, the axial speed of the being-formed tube and the linear speed of the pattern strip being at a fixed ratio to each other, cutting the pattern tube at intervals by continuously repeated cutting cycles, the main drive for the cutting operation being continuously taken from the winding drive, automatically comparing two indicator means so that differences between them institute a positional correction of the cutting cycle, one indicator means being operated by the pattern strip indicating the positional progress of successive patterns past a reference station before winding and the other indicator means indicating the progress of the cutting cycle, said automatic comparison being performed continuously during the whole of the cutting cycle; whereby the cutting cycle is maintained in constant relationship with the patterns at the point of reference and errors of relationship corrected for immediately they occur.

7. Apparatus for making containers with a unitary pattern strip spirally wound on the outside comprising means for spirally winding one or more strips of material one of the strips bearing unitary patterns of a form to produce a required pattern on the surface of the tube, a mandrel on which the strips of material are wound, there being periodic perforations in the unitary pattern strip, in combination with a freely rotatable drum over which the periphery of which the unitary pattern strip passes in physical contact, pegs adapted to engage the perforations in the strip whereby the drum moves in rotational synchronism with the patterns on the strip, means adapted to perform cutting operations upon the tube in synchronized relation with the movement of patterns on the strip visibly engaging the drum.

8. Apparatus for making containers with a unitary pattern strip spirally wound on the outside, comprising means for spirally winding one or more strips of material into a tube, one of the strips bearing unitary patterns to produce a required pattern on the surface of the tube, a mandrel on which the strips of material are wound, there being periodic perforations in the unitary pattern strip, a freely rotatable drum over the periphery of which a unitary strip passes in physical contact therewith, pegs adapted to engage the perforations in the strip whereby the drum moves continuously in rotational synchronism with the patterns on the strip, thus tying the time of cutting continuously to the pattern strip, said point of physical contact acting as a first point of reference on the strip remote from the length of tube to be cut off during the current cutting cycle and acting as a first control means for maintaining a preset phase relationship between the cutting means and the patterns considered at the point of first reference, in combination with a second control means located within the length of tube to be cut off during the current cutting cycle adapted to correct residual and register error such as incorrect phasing of the cutting means and tube occurring since the first point of reference in close registry with the ends of the container lengths as controlled by the second point of reference.

9. Method of making spirally wound containers with the unitary pattern appearing on the outside by spirally winding one or more strips of material onto a mandrel continuously, comprising the steps of winding one or more strips of material to form a tube, one of the strips bearing unitary patterns to produce required patterns appearing on the outside of the tube, the step of keeping the axial speed of the being-formed tube and the linear speed of the pattern strip at a fixed ratio to each other, cutting the patterned tube at intervals by continuously repeated cutting cycles, continuously indicating the positional progress of successive patterns past a reference station before winding by indicator means and continuously indicating progress of the cutting cycles by a second indicator means, automatically comparing the readings of the two indicator means unceasingly during all of the aforesaid cutting cycles, thereby indicating cutter position error immediately it occurs, and immediately correcting the position of the cutter in its cutting cycle to eliminate said error according to the comparison of the two readings; thereby keeping the cutting cycles in constant phase relationship with the patterns at the point of reference; whereby errors of relationship are corrected immediately they occur.

10. Apparatus for making spirally wound containers with a unitary pattern strip spirally wound on the outside comprising means for spirally winding one or more strips of material into a tube, one of the strips bearing unitary patterns of a form to produce a required pattern on the surface of the tube, a mandrel on which said strips are wound there being repeated periodic perforations in the unitary pattern strip having a fixed relationship to at least some of the patterns, a freely rotatable drum over the periphery of which said unitary pattern strip passes in physical contact, pegs on the periphery of the drum adapted to engage the perforations in the strip whereby the drum moves continuously in rotational synchronism with the patterns on the strip, a cutter, and means connected to said cutter for moving it in a cutting cycle to cut the being-formed tube into lengths, in combination with means connected to said drum for continuously indicating the position of the drum as the pattern strip moves over it, means connected to said cutter moving means for indicating the progress of the cutter in its cutting cycle, and means responsive to said drum position indicating means, for controlling the movement of the cutter by continuously positioning said cutter in its cutting cycle according to changing drum positions as the strip progresses over said drum, whereby the cutting means are kept in proper registry with the unitary patterns on the tube.

11. Apparatus according to claim 10, wherein said means controlling the movement of the cutter by continuously positioning it in its cutting cycle according to changing drum positions comprises a differential unit to which said means for indicating each position of the drum as the pattern strip moves over it and said means for indicating the progress of the cutter in its cutting cycle are operatively connected, there being an output from said differential unit for indicating the comparative progress of said two indicating means relative to each other, said output controlling cutter movement.

12. Apparatus according to claim 10, wherein said means for controlling the movement of the cutter by continuously positioning it in its cutting cycle according to changing drum positions comprises a hydraulic valve having a plunger mounted on the means for indicating the progress of said cutter in its cutting cycle, said means for indicating each position of the drum being mounted on the drum at a point adjacent said valve and being adapted to operate said plunger as the drum rotates, there being a hydraulic power source feeding hydraulic fluid to said valve, said means for moving said cutter in a cutting cycle comprising a hydraulic rotatable motor the speed of which is controlled by said valve.

13. Apparatus for making tubular containers with a unitary pattern appearing on the outside, comprising: means for continuously spirally winding one or more strips of material into tube, one of said strips bearing unitary patterns of a form to produce the required patterns on the tube, a freely rotatable element positioned upstream of said means for winding the tube, a unitary pattern strip passing over and being in physical contact with said freely rotatable element, in combination with reciprocating cutter means for cutting said tube into lengths having a rotatable input member for positively driving said cutter means and a servo mechanism operatively connected between said freely rotatable element and said rotatable input member for rotating said input member with a positively fixed relation to said freely rotatable element.

14. Apparatus for making tubular containers with a unitary pattern appearing on the outside, comprising means for continuously spirally winding one or more strips of material into tube, one of said strips bearing unitary patterns of a form to produce the required patterns on the tube, and having repeated periodic perforations therein having a fixed relationship to at least some of the patterns, a free rotatable element positioned upstream of said means for winding the tube, said rotatable element having pegs on its periphery to engage with the perforations in the pattern strip, in combination with reciprocating cutter means for cutting said tube into lengths having a rotatable input member for positively driving said cutter means and a servo mechanism operatively connected between said freely rotatable element and said rotatable input member for rotating said input member with a positively fixed relation to said freely rotatable element.

References Cited in the file of this patent
UNITED STATES PATENTS

| | | |
|---|---|---|
| 2,623,443 | Robinson | Dec. 30, 1952 |
| 2,623,445 | Robinson | Dec. 30, 1952 |